United States Patent
Yamazaki et al.

[15] 3,678,030
[45] July 18, 1972

[54] IMIDAZOLE DERIVATIVES INHIBITING NF SARCOMA

[72] Inventors: Akihiro Yamazaki; Teruo Furukawa; Izumi Kumashiro, all of Kanagawa, Japan

[73] Assignee: Ajinomoto Co., Inc., Tokyo, Japan

[22] Filed: Feb. 27, 1970

[21] Appl. No.: 15,245

[52] U.S. Cl. .................................. 260/211.5 R, 424/180
[51] Int. Cl. ............................................. C07d 51/50
[58] Field of Search ........................... 260/211.5 R, 211.5

[56] References Cited

UNITED STATES PATENTS 3,287,232  11/1966  Mitsugi et al. ............... 260/211.5 R
3,450,693  6/1969   Suzuki et al. ................ 260/211.5 R
3,535,207  10/1970  Shiro et al. .................. 260/211.5 R

OTHER PUBLICATIONS

Noller " Chemistry of Organic Compounds" 3rd. Ed. 1965, pp. 186 and 268, W. B. Saunders Co., Philadelphia, Pa.

*Primary Examiner*—Lewis Gotts
*Assistant Examiner*—Johnnie R. Brown
*Attorney*—Kelman and Berman

[57] ABSTRACT

Imidazole derivatives of the formula (I)

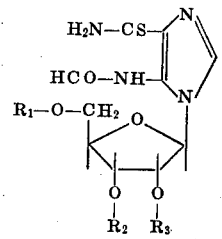

wherein $R_1$ is lower alkanoyl, and $R_2$ and $R_3$ are each lower alkanoyl or jointly lower alkylidene are readily prepared by reaction of formic acid with corresponding starting compounds having an amino group in position 5 of the imidazole ring, and hydrogen or lower alkanoyl groups instead of each of $R_1$, $R_2$, $R_3$ or alkylidene in $R_2$ and $R_3$. They inhibit the growth of NF sarcoma in mice.

4 Claims, No Drawings

IMIDAZOLE DERIVATIVES INHIBITING NF SARCOMA

This invention relates to imidazole derivatives, and particularly to imidazole derivatives which inhibit the growth of NF sarcoma in mice.

It has been found that novel derivatives of 5-formamido-4-thiocarbamoyl-1-β-D-ribofuranosyl-imidazole combine significant inhibiting activity against NF sarcoma in mice with low toxicity.

The compounds of the invention are of the formula (I)

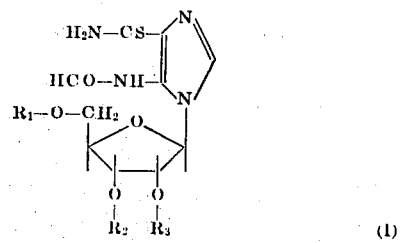

(I)

wherein $R_1$ is lower alkanoyl, and $R_2$ and $R_3$ are each lower alkanoyl or jointly lower alkylidene.

Representative compounds of the invention are identified below by capital letters, and will be referred to by such letters hereinafter for the sake of brevity:

Compound A: 5-formamido-4-thiocarbamoyl-1-(2′,3′,5′-tri-O-formyl-β-D-ribofuranosyl)-imidazole
Compound B: 5-formamido-4-thiocarbamoyl-1-(2′,3′,5′-tri-O-acetyl-β-D-ribofuranosyl)-imidazole
Compound C: 5-formamido-4-thiocarbamoyl-1-(2′,3′-O-isopropylidene-5′-O-acetyl-β-D-ribofuranosyl)-imidazole
Compound D: 5-formamido-4-thiocarbamoyl-1-(2′,3′-O-isopropylidene-5′-O-formyl-β-D-ribofuranosyl)-imidazole.

The compounds of the invention are readily obtained in good yields by reacting formic acid with a corresponding compound of the formula (II)

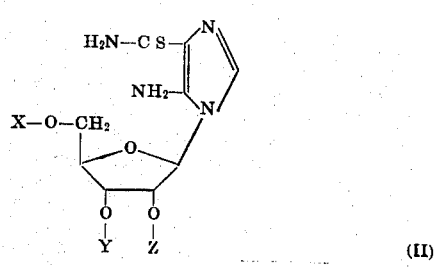

(II)

wherein X is hydrogen or lower alkanoyl, Y and Z are each hydrogen or lower alkanoyl, or jointly are lower alkylidene.

Preferred starting compounds of the formula (II) include:
5-amino-4-thiocarbamoyl-1-β-D-ribofuranosyl-imidazole,
5-amino-4-thiocarbamoyl-1-(2′,3′-O-isopropylidene-β-D-ribofuranosyl)-imidazole,
5-amino-4-thiocarbamoyl-1-(2′,3′-O-isopropylidene-5′-O-acetyl-β-D-ribofuranosyl)-imidazole,
5-amino-4-thiocarbamoyl-1-(2′,3′,5′-tri-O-acetyl-β-D-ribofuranosyl)-imidazole,
and others will readily suggest themselves to those skilled in the art.

The compounds of formula (II) are reacted with formic acid or with a salt of formic acid in the presence of an acid stronger than formic acid. The alkali metal, ammonium and alkaline earth metal formates are most conveniently available and preferred for this reason. They may be used in conjunction with hydrochloric, sulfuric, nitric or phosphoric acid, to name only the least expensive and readily available acids suitable for the purpose.

The water formed by the reaction is preferably removed. When the reaction is performed at ambient temperature of 5° to 30°C, the reactants are dispersed in a dehydrating solvent for water. When the reaction is performed at elevated temperature, a solvent is not needed, particularly if the reaction mixture is at its boiling point.

An excess of formic acid over the stoichiometrically equivalent amount of the compound of formula (II) is preferred, whether the formic acid is added to the reaction mixture as such or formed in situ from a formate and a stronger acid. Thus, more than 4 moles formic acid should be reacted with one mole of TAICAR, and more than 2 moles of formic acid with one mole of 5-amino-4-thiocarbamoyl-1-(2′,3′β-D-ribofuranosyl)-imidazole.

The compound of formula (I) is readily recovered from the reaction mixture in pure form by precipitation, solvent extraction or chromatographic methods. A solid reaction product may be filtered from the other constituents of the mixture and purified by washing with a suitable solvent. When the desired product is dissolved, the reaction mixture may be evaporated repeatedly in the presence of an alcohol, and then treated with activated alumina for recovering the compound of the invention.

The compounds of the invention are more effective against NF sarcoma in mice than 6-mercaptopurine while being less toxic, and are surprisingly superior to chemically closely related compounds as is evident from a comparison made between Compound A, 5-formamido-4-thiocarbamoyl-imidazole, 5-acetylamido-4-thiocarbamoylimidazole-1-(2′,3′,5′-tri-o-acetyl-β-D-ribofuranosyl)-imidazole, and 6-mercaptopurin. In the comparison tests, Swiss albino mice were given subcutaneous injections of NF sarcoma. 24 hours after the injection and daily thereafter for a total of 5 days, respective groups of mice were injected intraperitoneally with 30 mg/kg of the four compounds tested. After 10 days, the tumors were excised and weighed, and the effectiveness of the injected compounds was determined by comparison with tumors of otherwise similar mice which did not receive treatment after injection of the sarcoma. The percentage values listed in Table I below indicate that the average weight of the tumors in mice injected with Compound A was only 3 percent of the average tumor weight in untreated mice.

TABLE I

| Compound | Percent |
|---|---|
| Compound A | 3 |
| 5-formamide-4-thiocarbamoylimidazole | 15 |
| 5-acetylamino-4-thiocarbamoyl-1-(2′,3′,5′-tri-0-acetyl-β-D-ribofuranosyl)-imidazole | 127 |
| 6-mercaptopurine | 9 |
| Compound B | 5 |

The value $LD_{50}$ for Compound A as determined in mice which survived 14 days after the intraperitoneal injections was 3.11 millimoles per kg (1,200 mg/kg) while it was 1.20 millimole per kg (205 mg/kg) for 6-mercaptopurine.

The following examples are further illustrative of the compounds of the invention, and of the methods of preparing the same.

EXAMPLE 1

10 g 5-amino-4-thiocarbamoyl-1-β-D-ribofuranosyl-imidazole were dissolved in a mixture of 147 ml formic acid and 73 ml acetic anhydride with cooling, and the solution was kept at room temperature for 24 hours. A silky, yellow, crystalline precipitate was formed, recovered by filtering, washed with methanol and dried. It consisted of pure Compound A and weighed 12.6 g (90 percent yield). It was identified by elementary analysis and had the physical properties listed below.

Calculated for $C_{13}H_{14}N_4O_8S$:  40.41%C  3.65%H  14.50%N
Found:                                 40.66    3.42    14.35
Melting point: 170°C (decomp.)
UV absorption spectrum: λ EtOH max   289 and 337.5 mμ
IR absorption spectrum:              1700 cm⁻¹ : ( C   O)
                                     1474 cm⁻¹ : (NH₂—C=S)

$[\alpha]_D^{28.6°} = -15.5°$ (C=1, pyridine)

EXAMPLE 2

1 g 5-Amino-4-thiocarbamoyl-1-(2',3',5'-tri-o-acetyl-β-D-ribofuranosyl)-imidazole was dissolved in a mixture of 40 ml formic acid and 20 ml acetic anhydride, and the solution was kept overnight at room temperature. Methanol was added until a substantially clear solution was obtained, and the solution was evaporated to dryness in a vacuum. The residue was again dissolved in methanol, and the solution evaporated to dryness, and this procedure was repeated several times. Ultimately, the residue was dissolved in 10 ml chloroform, and the chloroform solution was passed through a column packed with activated alumina. The column was eluted with a mixture of benzene and ethyl acetate, and the eluate was evaporated to dryness in a vacuum. 519 mg compound B were obtained (42 percent yield). It had a melting point of 58°C and was identified by its elementary analysis:

| | | | |
|---|---|---|---|
| Calculated for $C_{16}H_{20}O_8N_4S$: | 44.85%C | 4.71%H | 13.08%N |
| Found: | 44.93 | 5.06 | 13.42 |

The UV spectrum showed values of $\lambda_{max}$EtOH at 290 and 329 mμ, and the specific rotation was $[\alpha]_D^{26.8°} = +90°$ (C=1 pyridine).

Compounds C and D are prepared in a manner obvious from Examples 1 and 2.

Experiment 1. Production of 5-amino-4-thiocarbamoyl-1-(2',3'5'-tri-o-acetyl-β-D-ribofuranosyl)-imidazole 3.2 g 5-amino-4-carbamoyl-1-(2',3',5'-tri-o-acetyl-β-D-ribofuranosyl)imidazole was dissolved in 40 ml pyridine with heating, to the resultant solution 1.97 g phosphorus pentasulfide was gradually added with stirring while heating on an oil bath of 120°C, and the mixture was stirred for further 2 hours. Pyridine was evaporated under reduced pressure, residues obtained were dissolved in 50 ml water, and after treated with active charcoal recrystallization from water was repeated twice. Pure crystals of 5-amino-4-thiocarbamoyl-1-(2',3',5'-tri-o-acetyl-β-D-ribofuranosyl)imidazole obtained weighed 1.05 g.

Properties of the crystals were as follows:
1. Melting point: 164 – 165°C (decomposed)
2. UV spectrum:
   $\lambda_{max}^{pH\ 1}$ 278 and 327 mμ
   $\lambda_{max}^{pH\ 13}$ 240, 273 and 324 mμ
3. Rf value: 0.69 on a paper chromatogram developed with n-butanol : acetic acid : water = 4 : 1 : 1 system (parts by volume)
4. Elementary analysis:

| | C(%) | H(%) | N(%) |
|---|---|---|---|
| Found | 45.18 | 5.04 | 13.84 |
| Calculated for $C_{15}H_{20}O_7N_4S$ | 44.99 | 5.03 | 13.99 |

Experiment 2. Production of 5-amino-4-thiocarbamoyl-1-(2',3'5'-O-acetyl-β-D-ribofuranosyl)-imidazole 11.98 g 5-amino-4-carbamoyl-1-(2',3'-O-isopropylidene-5'-acetyl-β-D-ribofuranosyl)imidazole was dissolved in 170 ml pyridine, 8.29 g phosphorus pentasulfide was added, and reacted as in the same way as in Experiment 1. Solvent was evaporated from the reaction mixture, residues obtained were dissolved in 200 ml water, and treated with 200 ml chloroform. The chloroform layer was washed with water, chloroform was evaporated, and resultant residue was dissolved in 100 ml methanol. 10 ml concentrated ammonia was added to the methanol solution, and the mixture was stirred for 2 hours at room temperature. Methanol was evaporated, to the residue picric acid saturated ethanol solution containing 2.5 g picric acid was added, and crystals precipitated were isolated by filtration. The crystals were recrystallized from ethanol, and pure crystalline 5-amino-4-thiocarbamoyl-1-(2',3'5'-O-acetyl-β-D-ribofuranosyl)imidazole picrate was obtained in an amount of 5.36 g. The crystal melted at 194° – 195°C (decomposed).

What is claimed is:

1. A compound of the formula

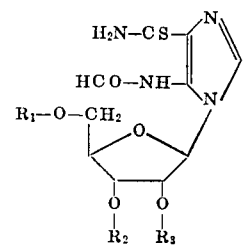

wherein $R_1$ is lower alkanoyl, and $R_2$ and $R_3$ are each lower alkanoyl or jointly lower alkylidene.

2. A compound as set forth in claim 1, wherein said alkanoyl is formyl or acetyl.

3. A compound as set forth in claim 1, wherein said $R_1$, $R_2$ and $R_3$ is formyl.

4. A compound as set forth in claim 1, wherein each of said $R_1$, $R_2$ and $R_3$ is acetyl.

* * * * *